United States Patent [19]

Shiraishi

[11] Patent Number: 5,802,480
[45] Date of Patent: Sep. 1, 1998

[54] ACTUATION APPARATUS FOR ACTUATING THE PROTECTIVE DEVICES FOR THE SAFETY OF VEHICLE OCCUPANTS

[75] Inventor: Hidehiro Shiraishi, Kobe, Japan

[73] Assignee: Sensor Technology Co., Ltd., Kobe, Japan

[21] Appl. No.: 640,946

[22] PCT Filed: Nov. 14, 1994

[86] PCT No.: PCT/JP94/01925

§ 371 Date: Jun. 5, 1996

§ 102(e) Date: Jun. 5, 1996

[87] PCT Pub. No.: WO95/13940

PCT Pub. Date: May 26, 1995

[30] Foreign Application Priority Data

Nov. 15, 1993 [JP] Japan .................. 5-309891

[51] Int. Cl.$^6$ ........................................ B60R 21/32
[52] U.S. Cl. ................ 701/45; 340/436; 280/735; 180/282; 307/10.1
[58] Field of Search ................ 701/45, 46, 47, 701/301; 340/435, 436, 438, 903; 180/232, 271, 282; 280/728.1, 734, 735; 307/9.1, 10.1

[56] References Cited

U.S. PATENT DOCUMENTS 5,073,860  12/1991  Blackburn et al. .............. 701/47
5,164,901  11/1992  Blackburn et al. .............. 701/47
5,495,414  2/1996   Spangler et al. ................ 280/735
5,638,274  6/1997   Konishi et al. ................. 701/45

Primary Examiner—Gary Chin
Attorney, Agent, or Firm—Oblon, Spivak, McClelland, Maier & Neustadt, P.C.

[57] ABSTRACT

An actuation apparatus (1) for actuating a protective device for the safety of vehicle occupants, including an accelerometer (S) which outputs a deceleration signal at a time of a crash; a central processing unit (16) in which the signal received from the accelerometer (S) undergoes arithmetic operations; a first memory (17) for the central processing unit (16), which is a read only memory and constitutes a one-chip microcomputer (2) together with the central processing unit (16), in which an algorithm for the signal received from the accelerometer (S) undergoing the arithmetic operations is preset; a second memory (18) for the central processing unit (16), which is a writable memory and is preset with parameters for use in the arithmetic operations, the parameters are determined by crash tests varying according to vehicle type and are specific values corresponding to a specific type of vehicle; and an ignition circuit (6) for actuating the protective device on a basis of a signal received from the central processing unit (16). The memory (18) is mounted on a chip such as an EEPROM separate from and connected to the one-chip microcomputer (2).

4 Claims, 9 Drawing Sheets

ACTUATION APPARATUS FOR ACTUATING THE PROTECTIVE DEVICES FOR THE SAFETY OF VEHICLE OCCUPANTS

BACKGROUND OF THE INVENTION

1. Field of the Invention

The present invention relates to an actuation apparatus for actuating protective devices mounted on a vehicle for safety of vehicle occupants. More particularly, the present invention relates to an actuation apparatus which enables vehicles produced by process of mass production to be used for crash tests. The crash tests are done for obtaining parameters to be set in the actuation apparatus for actuating the protective devices.

2. Background of the Invention

One actuation apparatus for actuating the protective devices mounted on a vehicle for safety vehicle occupants is known as prior art, which comprises an accelerometer which outputs a deceleration signal at a time of a crash, a central processing unit (CPU) for processing the signal received from the accelerometer and judging a severity of the crash, a MASK ROM connected to the CPU, and an ignition circuit for triggering the protective devices such as an air bag on the basis of a signal received from the CPU. The CPU and the MASK ROM are formed into a one-chip microcomputer. The MASK ROM includes an algorithm for judging the severity of the crash and different parameters different for each type of vehicle. The CPU judges the severity of the crash using arithmetic operations in an algorithm using the aforesaid different parameters. When the CPU judges that the severity of the crash requires an actuation of the protective devices, an actuating signal is fed to the protective devices.

In the prior art, both the algorithm and parameters are written on the MASK ROM which is a read only memory. The writing task is carried out by masking during a manufacturing process of the MASK ROM.

It takes a long time to design a circuit on the one-chip microcomputer on which the algorithm together with the parameters will be masked. Further, it takes a long time to manufacture the one-chip microcomputer. It is common to take a few months for the one-chip microcomputer to be completed.

It takes another three months or so to test a reliability of the one-chip microcomputer as an integrated circuit (IC). After the reliability of the one-chip microcomputer is assured, preparations for the mass production of the vehicle will be started. The mass-produced vehicle will be equipped with the actuation apparatus for actuating the protective devices having the one-chip microcomputer.

In order to preset parameters for various types of vehicles, data have to be obtained from crash tests. Typically, more than twenty vehicles have to be subjected to the crash tests for each vehicle type. All vehicles subjected to the crash tests are trial products because the crash tests are done within 2–6 months before necessary preparations for the mass production of the vehicles. This creates a problem wherein a cost of one trial product is very expensive as compared with a cost of one vehicle produced by a process of mass production. Therefore, determining parameters by the crash tests results in high costs.

SUMMARY OF THE INVENTION

In view of the above-described problem, the primary object of the invention is providing an actuation apparatus for actuating a protective device for safety of vehicle occupants, which determines parameters by crash tests using vehicles produced by a process of mass production. Another object of the present invention is to provide an actuation apparatus for actuating a protective device for safety of vehicle occupants, which enables a period required for a development of a new vehicle model to be shortened and enables a cost of the development to be drastically reduced.

The actuation apparatus which is the subject of the present invention includes;

- an accelerometer S which outputs a deceleration signal when a crash occurs;
- a central processing unit 16 in which the signal received from the accelerometer S undergoes arithmetic operations;
- a first memory 17 and a second memory 18 for the central processing unit 16; and
- an ignition circuit 6 for triggering the protective device on the basis of a signal received from the central processing unit 16.

In one aspect of the present invention the memory means for the central processing unit 16 is divided into the first memory 17 and the second memory 18. The first memory 17 is a read only memory, included in a one-chip microcomputer 2 together with the central processing unit 16. The first memory 17 is formed as a MASK ROM of the one-chip microcomputer 2. An algorithm for computing the signal received from the accelerometer S has been preset in the first memory 17 formed as the MASK ROM. The algorithm preset in this MASK ROM can be decided without crash tests because it is common to all types of vehicles. The second memory 18 is a writable memory in which parameters used during the computing are preset. These parameters in the second memory 18 have to be determined by crash tests because these parameters vary according to the vehicle type. Accordingly, these parameters in the second memory 18 are specific values correspond to a specific type of vehicle. In other words, there is a significant disadvantage where these parameters cannot be determined until the crash tests are done. The present invention solves this problem by means of the second memory 18 in which the parameters can be written even after the assembling of the one-chip microcomputer 2. Thus the present invention permits the parameters to be determined by crash tests conducted with mass-produced vehicles.

In addition to the aforesaid algorithm for computing the signal received from the accelerometer S, first parameters used during the computing are preset in the first memory 17. These first parameters are used as a countermeasure after reading the first memory 17 when second parameters in the second memory 18 cannot be read. The first parameters constitute common parameters to all types of vehicles and are distinguished from non-common parameters. The first parameters include such numbers as applied when the crash would bring serious injury upon vehicle occupants. The common parameters can be predicted by data of the crash upon large number types of vehicle. Second parameters which are specific values corresponding to each specific type of vehicle are preset in the second memory 18. The second parameters in the second memory 18 are numbers which are determined by crash tests and vary according to the types of vehicles as described above. The first parameters are used after being read from the first memory 17 when the second parameters cannot be read from the second memory 18. Thus, the present invention deals with such crashes which require actuating of the protective devices by applying both the first and the second parameters.

The second memory 18 may be formed on another chip separate from and connected to the one-chip microcomputer 2. An EEPROM externally connected to the one-chip microcomputer 2 is applicable to this case. Further, an algorithm for diagnosing the actuation apparatus may be preset in the first memory 17 in addition to the algorithm for computing the signal received from the accelerometer S, and the results of the diagnosis may be written into the second memory 18. In this way, the memories 17 and 18 are used for judging both on the severity of the crash and diagnosing the actuation apparatus. Further, in a case where a communication interface 15 is connected to the one-chip microcomputer 2, the second parameters can be preset into the second memory 18 through the communication interface 15, and the results of diagnosis in the second memory 18 can be fed to an external device through the communication interface 15.

BRIEF DESCRIPTION OF THE DRAWINGS

A more complete appreciation of the invention and many of the attendant advantages thereof will be readily obtained as the same becomes better understood by reference to the following detailed descriptions when considered in connection with the accompanying drawings wherein.

DESCRIPTION OF THE PREFERRED EMBODIMENTS

Figure 1:
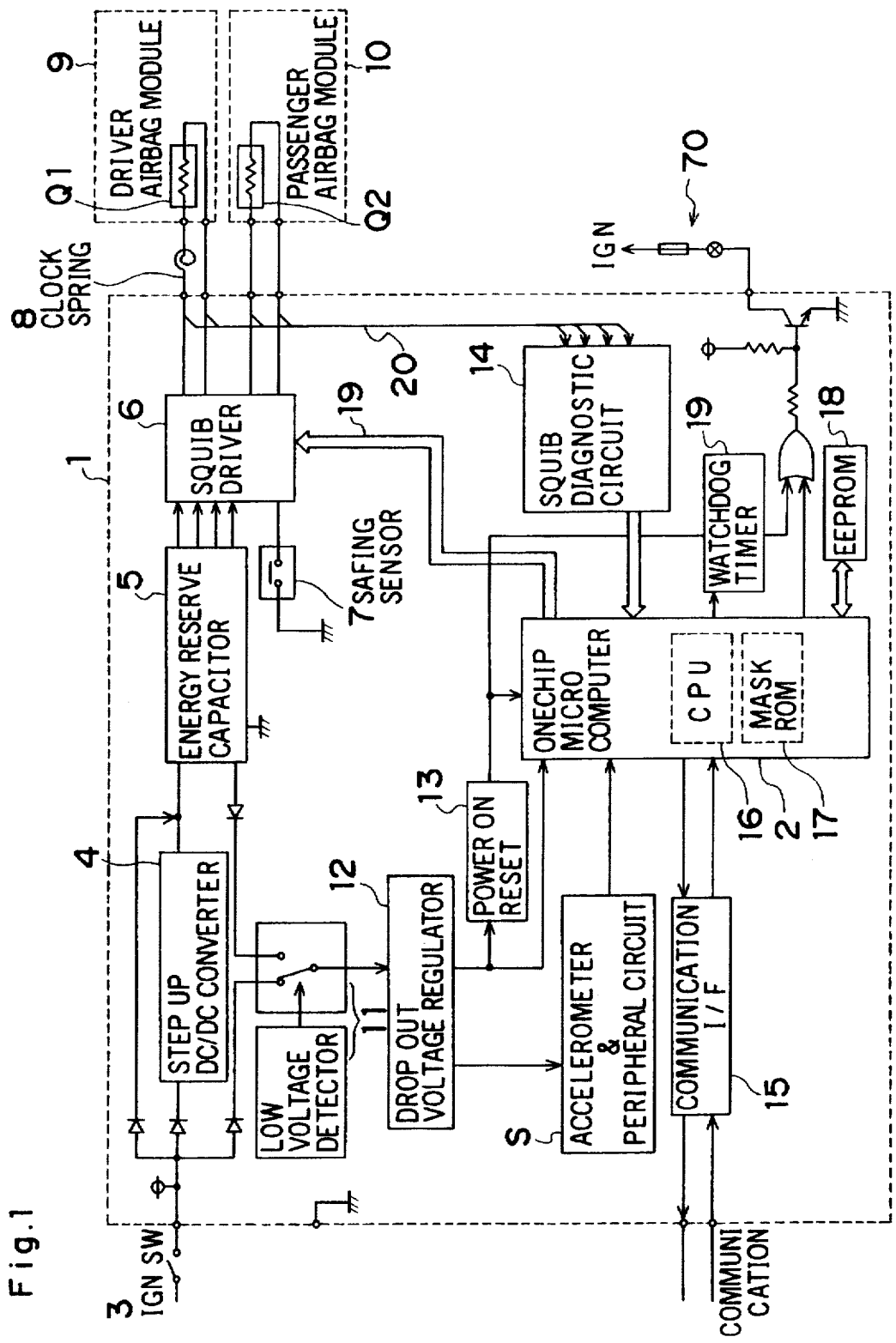
FIG. 1 is a block diagram to help explain the construction of the actuation apparatus in according to the present invention.

Referring now to the drawings, wherein like reference numerals designate identical or corresponding parts throughout the several views, and more particularly to FIG. 1 thereof, there is illustrated an apparatus for actuating protective devices for safety of vehicle occupants 1 connected to protective devices including an airbag module 9 for a driver and an airbag module 10 for a passenger.

In FIG. 1, an ignition switch 3 is connected to a battery of a vehicle (not shown). An energy reserve capacitor 5 is connected to the ignition switch 3 through a step up DC/DC converter 4. Electric power with voltage increased by the step up DC/DC converter 4 is stored in the energy reserve capacitor 5.

There is a squib driver 6 and a safing sensor 7 between the terminals of the energy reserve capacitor 5 in series with each other. Even if the squib driver 6 is in a drive state, the airbags will not inflate except when the safing sensor 7 closes the circuit. Thus the aim of the provision of the safing sensor 7 is to prevent the airbags from being inflated by mistake. Output terminals of the squib driver 6 are connected to squibs Q1 and Q2 incorporated in the driver airbag module 9 and the passenger airbag module 10; respectively. A portion of the line for connecting between the squib driver 6 and the squib Q1 consists of a clock spring 8, which is disposed in a transition section from a stationary part to a rotatable steering shaft in the vehicle and follows rotation of the steering shaft. The above-described construction avoids such instantaneous openings of the circuit as occur when a slip ring is used in this portion. Accordingly, the airbag can inflate whenever a crash occurs. Output signals from the one-chip microcomputer 2 are fed to the squib driver 6. The voltage 20 between terminals of each squib Q1 and Q2 is fed to a squib diagnostic circuit 14. Output signals from the squib diagnostic circuit 14 are fed to the one-chip microcomputer 2. Output signals from the accelerometer S which detects deceleration caused by the crash, are also fed to the one-chip microcomputer 2. The one-chip microcomputer 2 includes an MASK ROM 17 integrately. An EEPROM 18 and a communication interface 15 are connected to the one-chip microcomputer 2.

An alarm device 70 is appropriately provided in the interior of the vehicle. The numerals 11 and 12 refer to a selector device and a drop out voltage regulator, respectively. The selector device 11 selects electrical energy from either the battery mounted on a vehicle or the energy reserve capacitor 5 and then supplies electrical energy to the drop out voltage regulator 12. The drop out voltage regulator 12 converts to the electrical energy to low-voltage electric power for operation of the accelerometer S and the one-chip microcomputer 2. The numeral 13 and 19 refer to a power on reset circuit and a watchdog timer 19, respectively. These devices detect if the one-chip microcomputer 2 is overrunning and adjust it accordingly.

Each of the airbag modules 9 and 10 includes the squib Q1 or Q2, a gas generator (not shown) incorporating the squib, and an airbag connected to the gas generator.

When the squib incorporated in the gas generator is heated by current flowing through it, the gas generator generates gas and then the gas inflates the airbag so as to save the vehicle occupants.

Reference will now be specifically made to the functions of the squib driver 6 and the squib diagnostic circuit 14. The squib driver 6 normally keeps an actuation circuit open. This actuation circuit consists of the squibs Q1 and Q2, which are connected in parallel to each other, and the safing sensor 7.

On receipt of an actuation signal from the one-chip microcomputer 2, the squib driver 6 closes the actuation circuit while the safing sensor 7 also closes the actuation circuit because of a crash so as to supply electric power stored in the energy reserve capacitor 5 to the squibs Q1 and Q2.

The voltage 20 between the terminals of each squib Q1 and Q2 is fed to the squib diagnostic circuit 14. The voltage 20 is measured on the basis of diagnostic current input into the squib driver 6. The voltage 20 undergoes electrical treatment in the squib diagnostic circuit 14 and is output to the one-chip microcomputer 2. Reference will now be specifically made to the details of the one-chip microcomputer 2 and the EEPROM 18. The one-chip microcomputer 2 is a single chip which unifies the functions of the central processing unit (CPU) 16, MASK ROM 17 corresponding to a first memory, I/O port (not shown), etc. Principally, the one-chip microcomputer 2 is used as control means.

Figure 2:
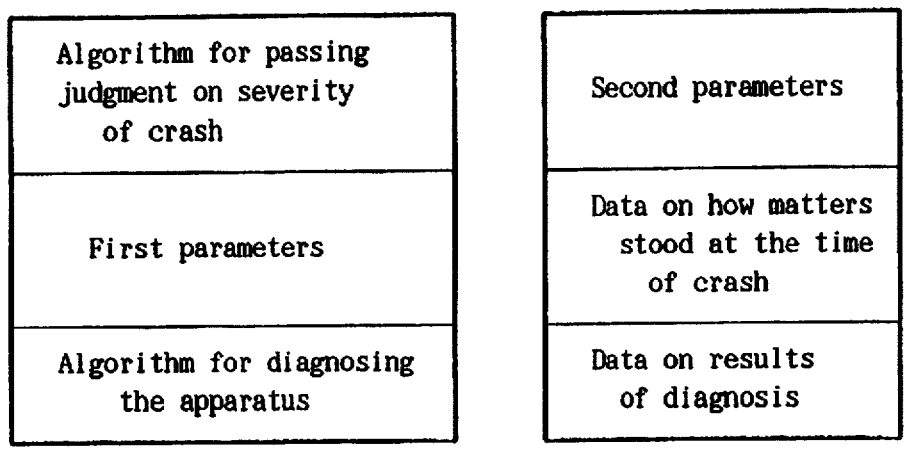
FIG. 2 shows the contents of data stored in the MASK ROM and the EEPROM of FIG. 1.

As shown in FIG. 2, the MASK ROM 17 is a read only memory in which resides an algorithm for judging the severity of a crash, first parameters for use in arithmetic operations in accordance with the algorithm, and an algorithm for diagnosing that the actuation apparatus is preset. As will be further described, the first parameters constitute common parameters to all types of vehicles and are distinguished from non-common parameters. The first parameters include such numbers as applied when a crash would bring serious injury upon vehicle occupants.

The EEPROM 18 corresponding to a second memory is an electrically erasable read only in which data can be electrically deleted and written with a specific means by 1 byte as a unit. As shown in FIG. 2, the second parameters are preset in the EEPROM 18, and data concerning to the crash and the results of diagnosis will be written into the EEPROM 18. As will be later described, the second parameters are numbers which are determined by crash tests and vary according to the types of the vehicles. In second memory 18, specific numbers corresponding to a specific type of vehicle are preset.

In this embodiment, the EEPROM 18 is mounted on another chip separate from the one-chip microcomputer 2. As an alternative arrangement, the EEPROM 18 may be mounted on the one-chip microcomputer 2. The object of the present invention can also be achieved in this alternative arrangement, because the second parameters can be written into the EEPROM 18 even after the assembly of the one-chip microcomputer 2.

Referring again to FIG. 1, diagnosing function of the present invention will now be described. The central processing unit 16 periodically supplies a feeble diagnosing current to the squib driver 6 on the basis of the algorithm for diagnosing and judges whether the actuation apparatus 1 is out of order or not on the basis of the signal received from the squib diagnostic circuit 14. The results of the diagnosis are stored in the EEPROM 18 while the central processing unit 16 actuates the alarm device 70 so as to notify the vehicle occupants when the actuation apparatus 1 is found to be out of order. Further, data on the results of diagnosis can be fed to an external device through the communication interface 15. The prior actuation apparatus is also equipped with the diagnosing function and the one-chip microcomputer 2 with the EEPROM 18 for diagnosing. Therefore, for judging a severity of a crash, the actuation apparatus of the present invention uses a one-chip microcomputer 2 and a EEPROM 18 for diagnosing. This saves manufacturing costs of the actuation apparatus because only the algorithm and parameters for judging the severity of the crash have to be additionally written to the one-chip microcomputer 2 and the EEPROM 18 for diagnosing in the prior art actuation apparatus.

Reference will now be specifically made to the function of a judgment on a severity of a crash.

In the central processing unit 16, the deceleration signal received from the accelerometer S undergoes arithmetic processes in accordance with the algorithm for judging the severity of a crash using the first parameters preset in the MASK ROM 17 and the second parameters preset in the EEPROM 18. (A means for writing the second parameters into the EEPROM 18 will be later described.) A trigger signal 19 is fed to the squib driver 6 when the severity of the crash is judged to require the actuation. Data on how matters stood at the time of the crash are written into the EEPROM 18. As occasion demands, these crash data can be fed from the EEPROM 18 to an external device through the communication interface 15.

Reference will now be specifically made to the most important feature of the invention, which is a means for writing the second parameters into the EEPROM 18. These second parameters vary according to types of vehicles and, therefore, have to be obtained from crash tests. In accordance with the present invention, the second parameters can be written into the EEPROM 18 even after the actuation apparatus 1 is mounted on the vehicle with the protective device. Therefore, the vehicle can be assembled with the EEPROM 18 into which the second parameters have not yet been written. After assembling the vehicle, the second parameters are written into the EEPROM 18 through an external communication interface (not shown).

The external communication interface is only subject to writing tasks and can work only when the external communication interface is connected to the communication interface 15 incorporated in the actuation apparatus 1. One external communication interface is provided for each type of the vehicle. The name of the type of vehicle is indicated on an outside surface of each external communication interface. This would serve the purpose of preventing errors caused by writing second parameters which do not match a type of vehicle into the EEPROM 18. After the confirmation of the contents of data written into the EEPROM 18, the EEPROM 18 is sealed so as to prevent data from being further written.

Thus there is an important feature of the present invention in that the point where the process of writing the second parameters into the EEPROM 18 can be separated from the processes for manufacturing the one-chip microcomputer 2. The manufacturing of the one-chip microcomputer 2 has to be completed before the vehicle begins to be mass-produced. Therefore, the present invention permits mass-producing the vehicle by providing the actuation apparatus incorporating the EEPROM 18 into which the second parameters have not yet been written. The mass-produced vehicles mounted by the actuation apparatus are subject to crash tests in order to obtain the second parameters. And then the second parameters obtained from the crash tests are written into the EEPROM 18 incorporated in the actuation apparatus through the external communication interface. As a result of that, number of experimental models used for crash tests is minimized. The experimental model is hand-made and expensive. Therefor, the present invention enables cost for the development of a new model to decrease.

Further, a period of time required for the manufacture of the one-chip microcomputer 2 is drastically shortened because the process of writing the second parameters into the EEPROM 18 is separated from the processes for manufacturing the one-chip microcomputer 2 completely so as to write the second parameters after the start of the mass production of the vehicle. It takes a long period of time to determine the second parameters since the second parameters are obtained from the crash tests. As a result of that, a period of time required for the development of a new model can also be drastically shortened. Furthermore, the protective device can be standardized irrespective of types of the types of vehicles on which the protective device is to be mounted because second parameters varying according to types of vehicles can be written into the EEPROM 18 after the protective device is mounted on the vehicle. Quality control is facilitated by this advantage.

Figure 3:
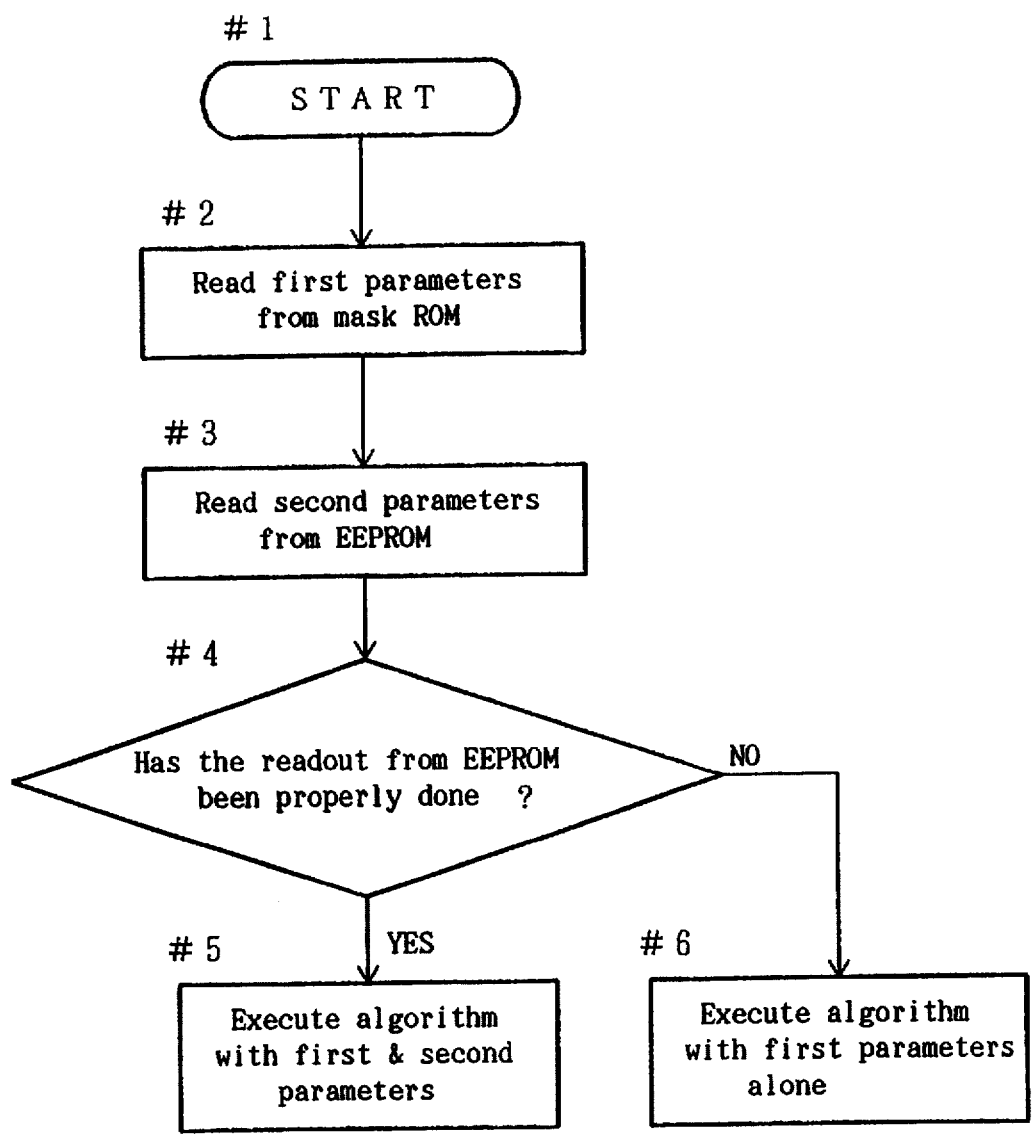
FIG. 3 is a flow diagram representing a program that tells the one-chip microcomputer what operations are to be performed according to the present invention.
Figure 4:
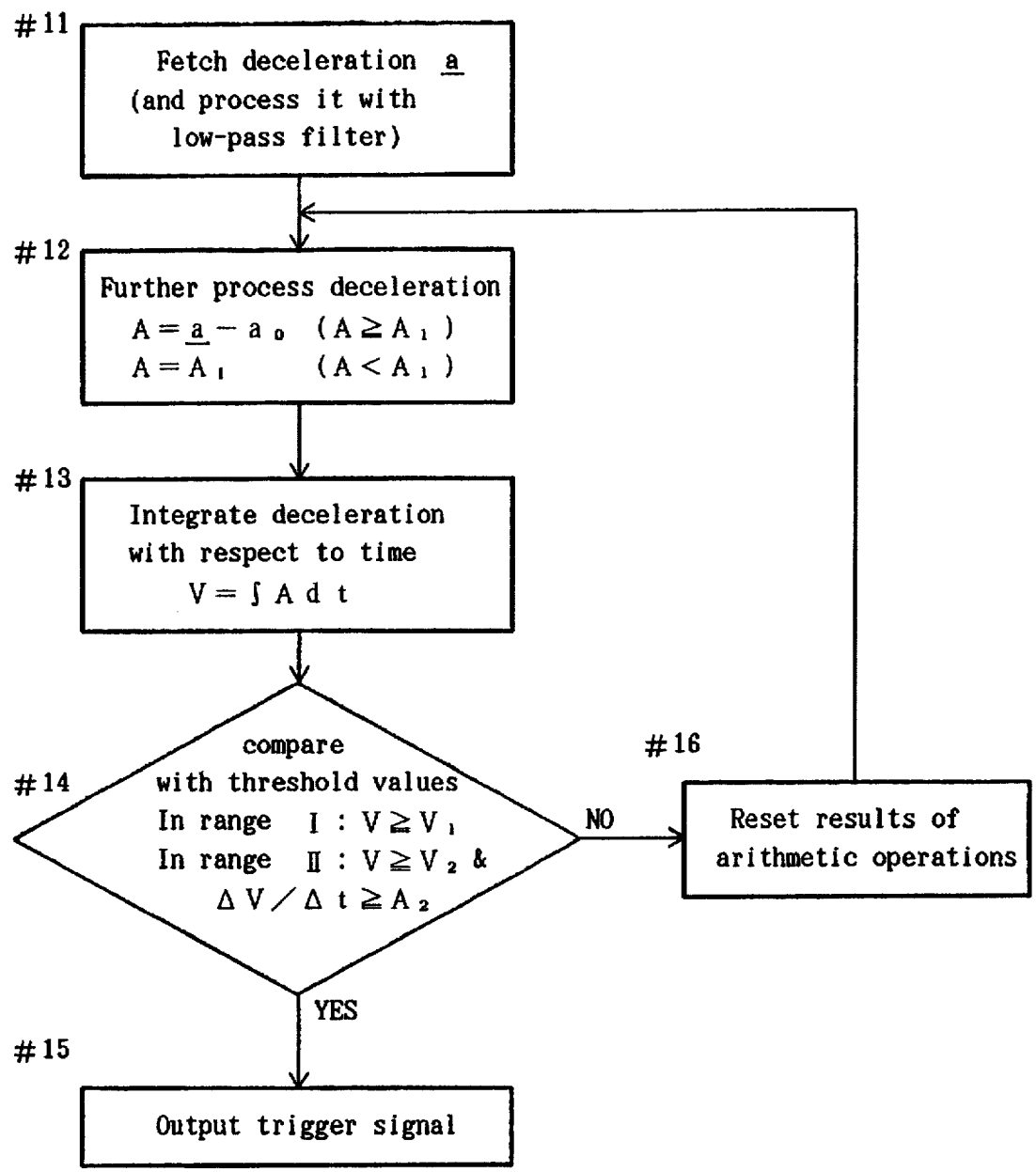
FIG. 4 is a flow diagram representing an algorithm according to the present invention.

Reference will now be specifically made to FIGS. 3 to 5 which are useful in understanding the algorithm for judging on the severity of a crash. Referring to FIG. 3, arithmetic operations begin (step #1), and the first parameters are read out from the MASK ROM (step #2). Then the second parameters are read out from the EEPROM (step #3), and determination is performed on whether or not the reading from the EEPROM has been properly done (step #4). When the reading is found to have been properly done, the algorithm is executed with the first and second parameters (step #5). On the other hand, the algorithm is executed with only the first parameters when the reading from the EEPROM is not found to have been properly done (step #6).

The contents of the previously discussed algorithm will now be described. Referring to FIG. 4, a deceleration processed by a low-pass filter is fetched, and outputted as a deceleration signal a (step #11). An offset value $a_0$ is subtracted from the deceleration signal a and the result of this subtraction is compared with a prescribed value $A_1$. When the result of the subtraction is greater than or equal to $A_1$, the subtracted deceleration A is defined as being equal to $a-a_0$ and, when the result of the subtraction is less than $A_1$, the subtracted deceleration A is defined as being equal to $A_1$ regardless of the actual result of the subtraction (step #12). This is a cutting off process. Then a velocity V is calculated by integrating the subtracted deceleration A with respect to time (step #13). The velocity V is compared with threshold values $V_1$ and $V_2$ which are prescribed values for ranges I and II respectively. The ranges I and II will appear hereinafter. Variation of the velocity $\Delta V/\Delta t$ is compared with a threshold value $A_2$ (step #14). A combination of the results of these comparisons is used for judging the severity of the crash. An AND condition, OR condition or a condition with weighting factor can be applied for making the combination.

Here is an example of the combination as follows: In the range I, a trigger signal is output when the velocity V is greater than or equal to the threshold value $V_1$, and in the range II, the trigger signal is output when the velocity V is greater than or equal to the threshold value $V_2$ and further $\Delta V/\Delta t$ is greater than or equal to the threshold value $A_2$ (step #15). In the range I, the trigger signal is not output when the velocity V is less than the threshold value $V_1$ and, in the range II, the trigger signal is not output when the velocity V is less than the threshold value $V_2$ or $\Delta V/\Delta t$ is less than the threshold value $A_2$. In the case of outputting no trigger signal, the results of arithmetic operations are reset and the processing returns to step #12 (step #16). The offset value $a_0$, prescribed value $A_1$, the threshold values $V_1$, the threshold values $V_2$, and threshold value $A_2$ are defined as parameters.

Figure 5A:
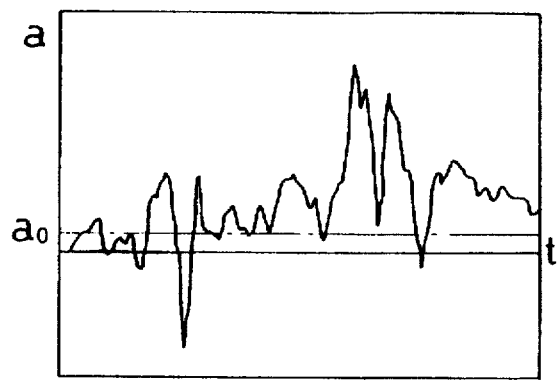
FIG. 5 is a graphical representation useful in understanding the algorithm of FIG. 4.
Figure 5B:
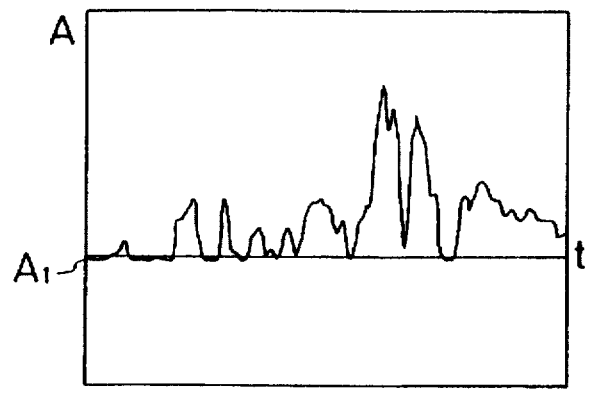
Figure 5C:
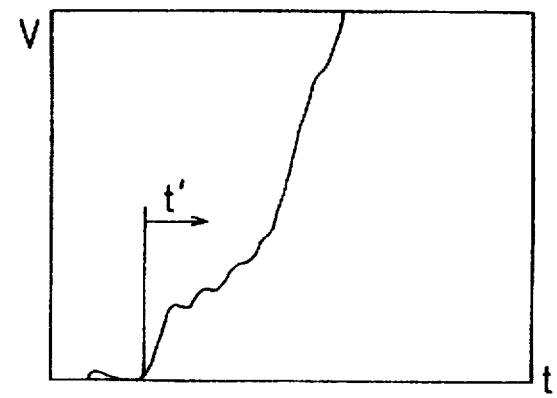
Figure 5D:
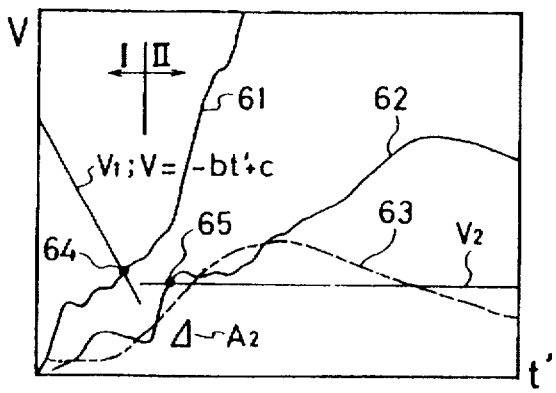

The contents of the algorithm will now be described with reference to graphs in FIGS. 5(a)–5(d). FIG. 5(a) shows an example of the deceleration signal a obtained from a head-on crash at high speed. The deceleration signal a has been processed by the low-pass filter. A positive value is set as the offset value $a_0$ in FIG. 5(a). FIG. 5(b) shows the subtracted deceleration A. The subtracted deceleration A is the result of subtracting the offset value $a_0$ from the deceleration signal a and regarded as $A_1$ when the result of the subtraction is less than the prescribed value $A_1$. FIG. 5(c) shows the velocity V which is the result of integrating as the subtracted deceleration A with respect to time t after a time point t'. Time point t' represents the time when the subtracted deceleration A exceeds a prescribed threshold value (not shown). FIG. 5(d) shows the velocity V after the time point t'. The velocity curves V concerning three types of crashes are shown in FIG. 5(d). In case of the head-on crash with high speed (61), the velocity V exceeds the threshold value $V_1$ prescribed for the range I at a point 64. Therefore, the trigger signal is output. In case of a head-on crash with intermediate speed (62), the velocity V exceeds the threshold value $V_2$ prescribed for the range II at a point 65 and the variation of the velocity $\Delta V/\Delta t$ also exceeds the threshold value $A_2$ at the point 65. Therefore, the trigger signal is output as well. A curve 63 represents the velocity V obtained from a head-on crash with low speed, which does not require the actuation.

The details of the parameters will now be described with reference to FIGS. 6 to 9. The parameters are numbers for use in arithmetic operations to be performed on the basis of the algorithm for judging on the severity of the crash. As shown in FIG. 9, the parameters 80 for a specific type of vehicle consists of parameters 81 common to all types of vehicles and parameters 82 varying according to a specific type of vehicle. The parameters 81 common to all types of vehicles can be estimated on a basis of data obtained from crash tests conducted in the past with many types of the vehicles. These common parameters are applicable to about 80% of all types of the crashes including the crash with high speed which causes a serious injury to vehicle occupants. The parameters 82 varying according to a specific type of vehicle consist of values such as correction factors for the fine adjustment of the common parameters 81 so as to be suited to a specific type of vehicle. Accordingly, the parameters 82 are determined by crash tests conducted with a specific type of vehicle. The un-common parameters 82 are applicable to the remaining 20% of all types of crashes. The uncommon parameters 82 correspond to the second parameters preset in the EEPROM 18 in FIG. 1, while the common parameters 81 correspond to the first parameters preset in the MASK ROM 17.

The value $a_0$, etc. are just some examples of parameters. The following description will be presented for the purpose of giving a concrete explanation of the value $a_0$, etc. In a case where the threshold value $V_1$ is given by a functional equation such as $V=-bt'+c$ which will appear hereinafter, concrete numerical values such as the coefficient $-b$ and the constant $c$ correspond to some of the parameters.

Figure 6:
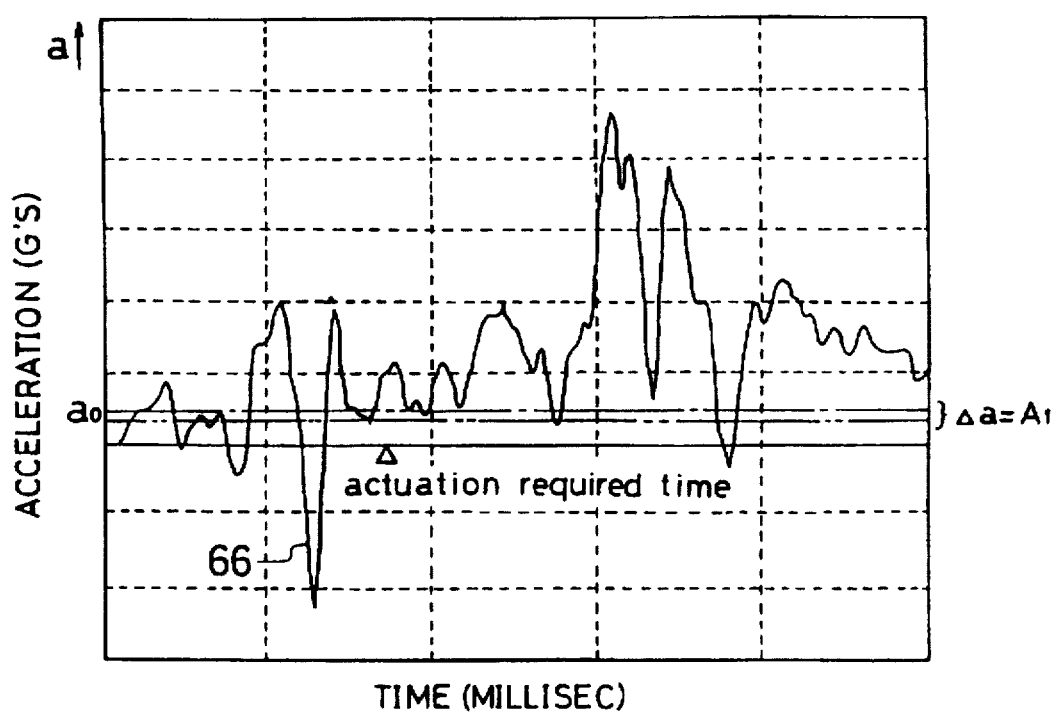
FIGS. 6 and 7 are graphs useful in understanding a value to be subtracted from the amount of deceleration and a value below which the deceleration signal is chopped off, according to the present invention.

As shown in FIG. 6, the offset value $a_0$ is set for the deceleration signal a, and further a prescribed value $\Delta a=A_1$ is set for offset value $a_0$. As previously discussed, the offset value $a_0$ is subtracted from the deceleration signal a after, the subtracted deceleration signal less than the prescribed value $A_1$ are cut off so as to be regarded as the value $A_1$. The aim of subtracting the value $a_0$ from the deceleration signal a is to keep noise down and thereby prevent incorrect operation. The aim of cutting off the subtracted deceleration signal less than $A_1$ is to make a sharp distinction between the head-on crash with low speed and the head-on crash with intermediate or high speed. If the deceleration signal a is integrated after a mere subtraction of the value $a_0$ therefrom without cutting off, the integrated value (velocity) will be negative value at a crack 66 of the deceleration signal's waveform. Therefore, the total amount of the integrated value is too small to make the sharp distinction between the head-on crash with low speed and the head-on crash with intermediate or high speed in the early stage of the crash. However, cutting off the deceleration signal results in making the crack of the deceleration signal's waveform shallow and thereby making the total amount of the integrated value large enough to make distinction between the head-on crash with intermediate or high speed and the head-on crash with low speed.

Figure 7:
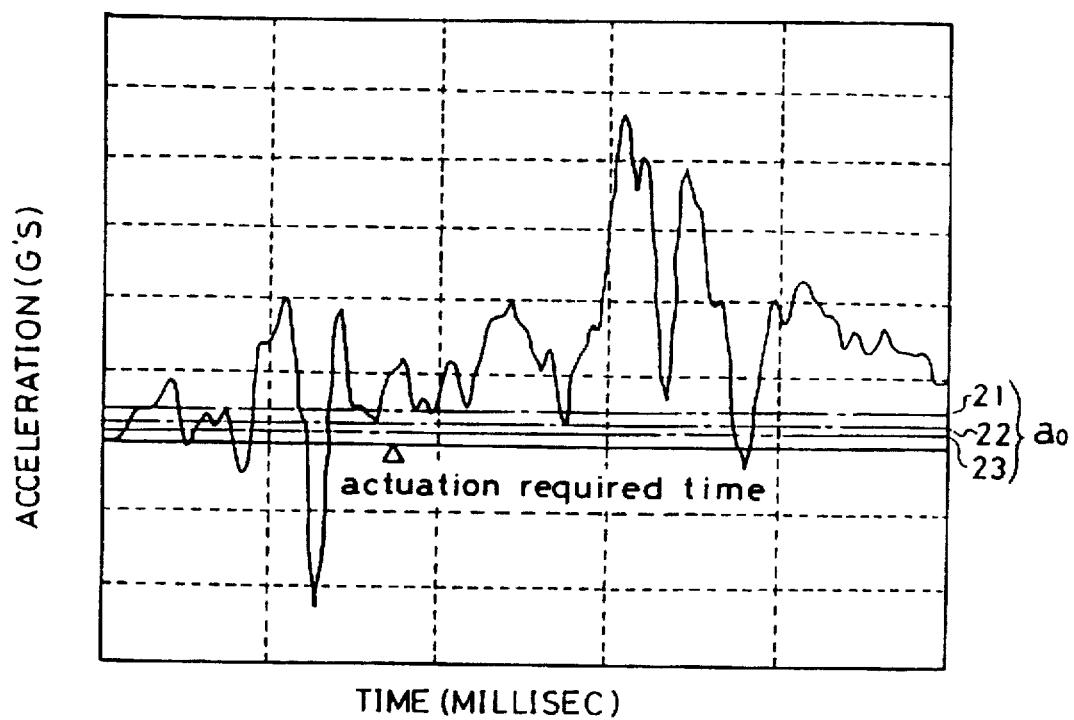

As shown in FIG. 7, three offset values $a_0$ are set in view of the fact that the waveforms of deceleration signals caused by crashes vary according to rigidities of the vehicle body. Numerals 21, 22, 23 in FIG. 7 show the three offset values $a_0$, respectively. Three values 21, 22 and 23 are set in consecutively decreasing order of magnitude in accordance with the consecutively decreasing order of rigidities of the vehicle body. By way of example, the largest value 21 is employed as the offset value $a_0$ common to all types of vehicles and is preset in the MASK ROM as the value corresponding to the first parameters. Numerical values for correcting the largest offset value 21 are preset in the EEPROM as the values corresponding to the second parameters in order to turn largest offset value 21 into the value 22 or 23 suited to the rigidity of a specific vehicle body.

In the case of employing the largest value 21 as the offset value $a_0$ common to all types of vehicles, there is a possibility of failing to actuate the protective device when a crash with the low speed or an oblique crash, since the corresponding deceleration signal is small and the integrated value of the deceleration signal is also small. There is little possibility of failing to actuate the protective device during the head-on crash with high speed due to the large deceleration signal. Further, in the head-on crash with high speed, there is little possibility that wrong operations are caused by noise. The prescribed value $A_1$ may be set in the same manner as the offset value $a_0$ or may be set as a uniform value for all types of vehicles.

Figure 8:
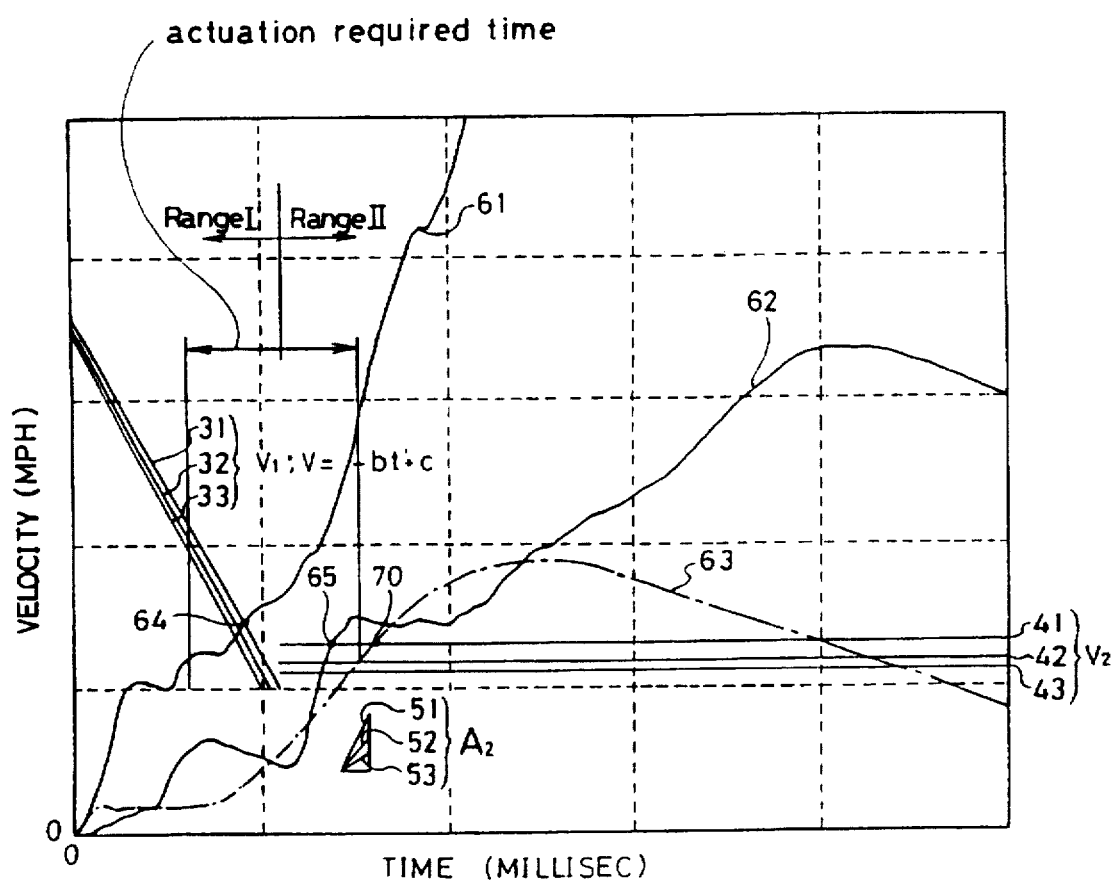
FIG. 8 is a graph useful in understanding threshold values for starting the protective device according to the present invention.
Figure 9:
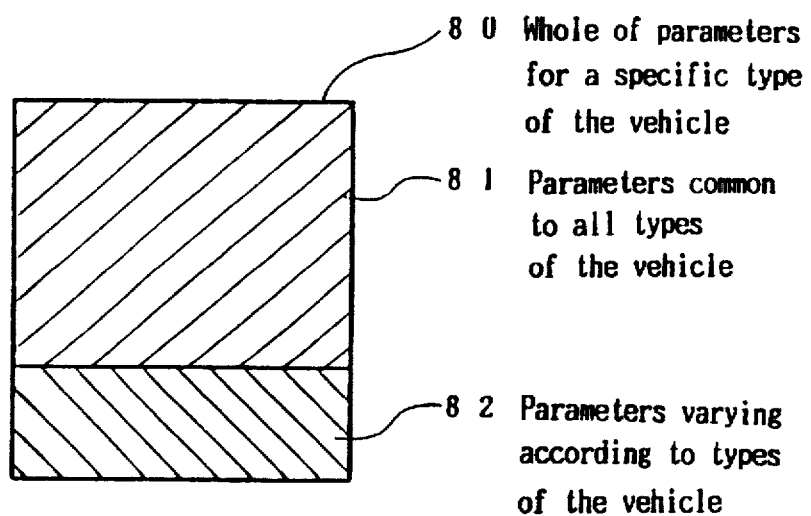
FIG. 9 shows various portions of the vehicle parameters.

In FIG. 8, curves 61, 62 and 63 represent velocities (i.e. integrated value about deceleration signal) at the time of head-on crashes with high speed, intermediate speed, and low speed, respectively. Threshold values, with which the velocity V is compared, are set for ranges I and II, respectively. The boundary between the ranges I and II agrees with the boundary between the initial half and the last half of the actuation required time in which the protective device should be actuated. By way of example, the threshold values set for the range I are represented by straight lines $V_1$ extending downwardly to the right as shown by the formula $V=-bt'+c$, while the threshold values set for the range II are represented by straight lines $V_2$ extending horizontally from the vicinity of the lower ends of the straight lines $V_1$ as shown by the formula $V=V_2$. The threshold value $A_2$, with which the variation of the velocity $\Delta V/\Delta t$ is compared, is given as a variation value at the time point when the velocity V exceeds the threshold values $V_2$ set for the range II, which are represented by the formula $\Delta V/\Delta t = A_2$.

The provision of the threshold values $V_1$, $V_2$ and $A_2$ is a distinct advantage. In case of the head-on crash with high speed, the velocity V represented by the curve 61 exceeds the threshold value $V_1$ at a time point 64, and the protective device can be actuated in the actuation required time. In case of the head-on crash with intermediate speed, the velocity V represented by the curve 62 exceeds the threshold value $V_2$ at a time point 65 and $\Delta V/\Delta t$ also exceeds the threshold value $A_2$ at the time point 65. Consequently, the protective device can be actuated in the actuation required time. In case of the head-on crash with low speed, the velocity V represented by the curve 63 exceeds the threshold value $V_2$ at a time point 70 but $\Delta V/\Delta t$ does not exceed the threshold value $A_2$ at the time point 70. Therefore, the protective device is not actuated although the time point 70 of the head-on crash with low speed is placed in close proximity to the time point 65 of the head-on crash with intermediate speed. Thus a sharp distinction can be made between the head-on crash with low speed and the head-on crash with intermediate speed.

There is a reason for allowing the straight lines $V_1$ to extend downwardly to the right in the range I in the point where the protective device is thereby prevented from being prematurely actuated. As described above, deceleration signal waves output at the time of the crash vary according to types of the vehicles and construction of the vehicle body. Therefore, the threshold values $V_1$, $V_2$ and $A_2$ are set in consecutively decreasing order of magnitude in accordance, e.g., with the consecutively decreasing order of rigidities of the vehicle body as denoted by the numerals 31 to 33, 41 to 43 and 51 to 53 respectively. By way of example, the largest values 31, 41 and 51 are employed as threshold values $V_1$, $V_2$ and $A_2$ common to all types of vehicles and are preset in the MASK ROM as the first parameters. In the case of the threshold value $V_1$ represented by the formula $V_1=-bt'+c$, such concrete numerical values as the coefficient $-b$ and the constant c correspond to the first parameters.

Numerical values for adjusting the threshold values 31, 41 and 51 are preset in the EEPROM as the second parameters so that the threshold values 31, 41 and 51 may turn into the threshold values suited to the rigidity of the specific vehicle body. In some cases, threshold values common to all types of vehicles may be preset in the EEPROM together with the numerical values for adjusting the threshold values 31, 41 and 51. The largest threshold values 31, 41 and 51 employed as the values common to all types of vehicles may possibly have an adverse effect of failing to actuate the protective device at the time of the head-on crash with intermediate speed. However, the largest threshold values 31, 41 and 51 make the actuation of the protective device at the time of the head-on crash with low speed to be almost impossible and further make the distinction between the head-on with high speed and the head-on with low speed to be definite. In this way, the largest threshold values 31, 41 and 51 are suitable for any type of vehicle.

There shall now be described functions of the apparatus of the invention in connection with FIGS. 1 and 3. As shown in FIG. 1, the apparatus 1 is always in the state of being diagnosed. When the apparatus 1 is found to be out of order, the trouble is reported to the vehicle occupants while the results of diagnosis are stored into the EEPROM 18.

On receipt of a deceleration signal, as shown in FIG. 3, the first parameters are read from the MASK ROM. Then the second parameters are read from the EEPROM. When the second parameters are properly read, the algorithm is executed with the second parameters so that the judgement suited to a specific type of vehicle may be made based on the severity of the crash. On the other hand, when the second parameters are not properly read out, the algorithm is executed with the first parameters so that the severity of the crash may be judged. The case of using only the first parameters is not always suited to all types of crashes but is suited to the case of the head-on crash with high speed where regardless of the vehicle type, a serious injury results to the vehicle occupants. The actuation apparatus of the present invention allows the second parameters to be written into the EEPROM even after the assembling of the one-chip microcomputer. This means allows the crash tests for determining the second parameters to be done using mass-produced vehicles. In this way, costs for setting parameters can be drastically curtailed. Further, when the second parameters can not be read from the EEPROM, the first parameters preset in the MASK ROM are used for preventing a serious injury from resulting to the vehicle occupants.

Referring again to FIG. 1, data on how matters stood at the time of the crash are stored in the EEPROM 18. These data, together with the results of diagnosis, are fed to an external device through the communication interface 15 and utilized for analysis.

In case of a highly reliable EEPROM used in the actuation apparatus of the invention, only algorithms will have to be preset in the MASK ROM.

FIELD OF INDUSTRIAL UTILIZATION

The device of the present invention is suited for actuating a protective device such as an air bag and can be mounted on an automobile which can be mass-produced with frequent model changes. The present invention may be mounted on another motor vehicle as well. The present invention is suited for actuating a protective device such as applying a pre-tensioning device for a seat belt as well as a protective device such as an air bag.

Obviously, numerous modifications and variations of the present invention are possible in light of the above teachings. It is therefore to be understood that within the scope of the appended claims, the invention may be practiced otherwise than as specifically described herein.

I claim:

1. An actuation apparatus for actuating a protective device for safety of vehicle occupants, comprising; an accelerometer which outputs a deceleration signal at a time of a crash;

a one-chip microcomputer, including, a central processing unit in which the signal received from the accelerometer undergoes arithmetic operations, and a MASKROM which is a read only memory, in which an algorithm for the signal received from the accelerometer undergoing said arithmetic operations is preset;

an EEPROM for said central processing unit, which is a writable memory; and an ignition circuit to actuate the protective device on a basis of a signal received from said central processing unit;

wherein parameters for use in said arithmetic operations, are preset in said MASKROM and said EEPROM;

said parameters are divided into first and second parameters;

the first parameters include common threshold values for actuating said protection device and are common to all types of vehicles and are preset in said MASKROM and the second parameters are for adjusting said common threshold values so as to correspond to a specific vehicle type and are preset in said EEPROM; and when the second parameters can be read from said EEPROM, said first parameters read out from said MASKROM are used in place of said second parameters preventing a malfunction of the actuating apparatus at a time of a crash so as to prevent serious injury to the vehicle occupants.

2. An actuation apparatus as defined in claim 1, wherein said EEPROM is mounted on a chip separate from and connected to said one-chip microcomputer.

3. An actuation apparatus as defined in claim 1, wherein an algorithm for diagnosing said actuation apparatus is preset in said MASKROM and the results of diagnosis are written into said EEPROM.

4. An actuation apparatus as defined in any of the claims 1 to 3, further comprising a communication interface connected to said central processing unit.

* * * * *